April 1, 1952　　　　P. J. KIRCHER　　　　2,591,162
FRUIT JUICER
Filed Oct. 19, 1946

Inventor
PAUL J. KIRCHER

By R. Clay Lindsey
Attorney

Patented Apr. 1, 1952

2,591,162

UNITED STATES PATENT OFFICE 2,591,162

FRUIT JUICER

Paul J. Kircher, Plainville, N. J., assignor to Landers, Frary & Clark, New Britain, Conn., a corporation of Connecticut Application October 19, 1946, Serial No. 704,494

10 Claims. (Cl. 100—41)

The present invention relates to fruit juicers, and more particularly to devices for squeezing fruit, such as oranges, lemons and the like, to extract juice therefrom.

The present invention is particularly concerned with fruit juicers of the type in which a section of fruit, such as a half orange, is placed between complementary convex and concave surfaces and then converging pressure is applied to squeeze the fruit between the surfaces to separate the juice from the pulp, the juice being collected in a suitable receptacle, such as a tumbler.

It is an object of the present invention to provide a fruit juicer of the type described which will function in an improved manner to facilitate the extraction of juice from fruit, said device being characterized by squeezing members which are brought together in a substantially straight line manner and with increasing mechanical leverage whereby the device is more efficient and more easily operable by the user.

A further object of the invention is to provide a fruit juicer of the character described in which the flow of juice is automatically controlled during the operation of the device so that the device will deliver juice only during predetermined periods of operation and at other times will be substantially "dripless."

Another object of the invention is to provide a fruit juicer which is of a sturdy construction and not susceptible to breakage during normal usage, which has a desired large capacity and pleasing appearance, rendering the same readily adaptable for use both in the household and in commercial establishments.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
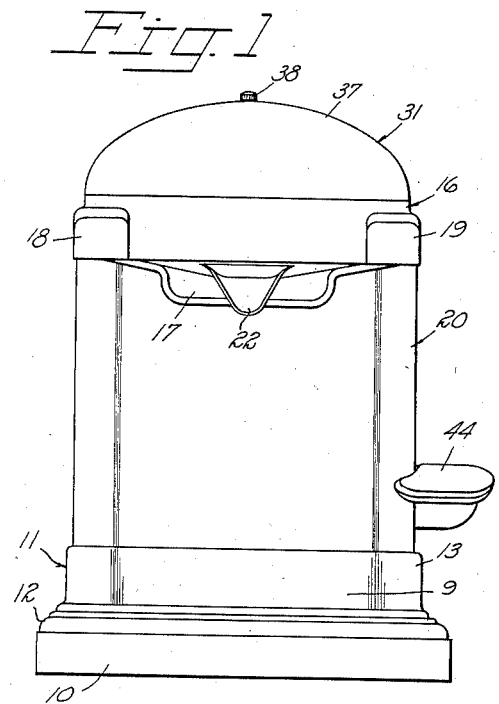
Figure 1 is a front view of the improved device constructed in accordance with the invention.
Figure 2:
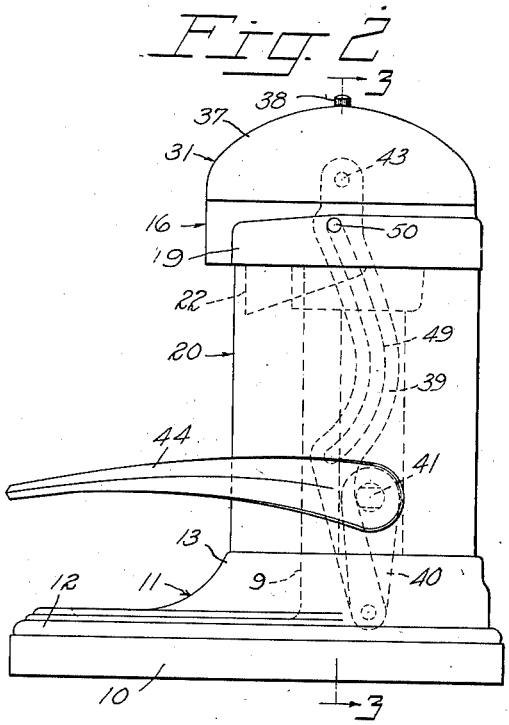
Fig. 2 is a side view of the device.
Figure 3:
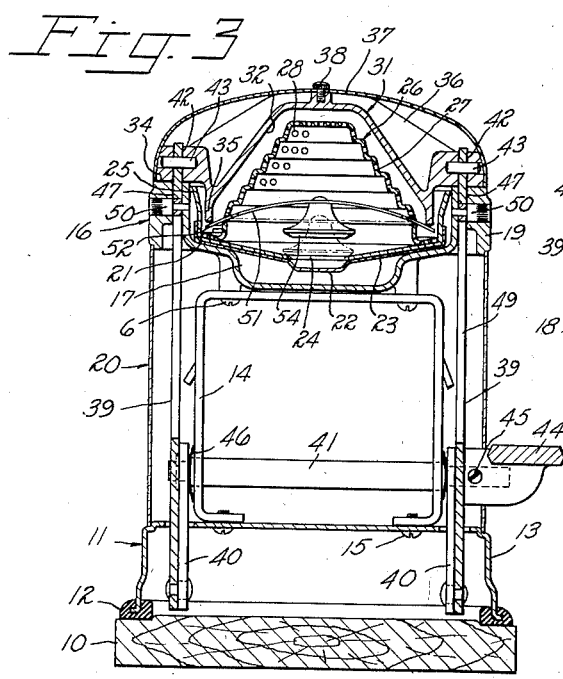
Fig. 3 is a cross sectional view taken along the line 3—3 of Fig. 2.
Figure 4:
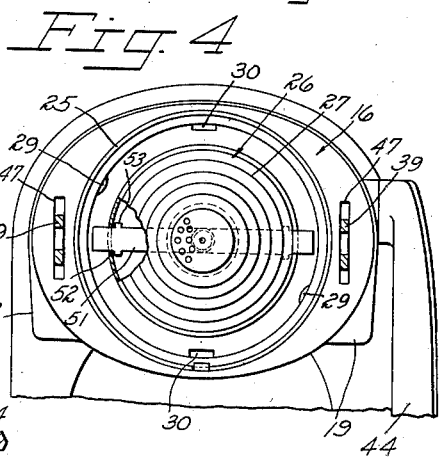
Fig. 4 is a top view of the device with the upper squeezing member removed.

Referring to the drawing, there is shown a device embodying the invention which is constructed with a lower housing member 11 removably mounted on a suitable base plate 10 with a resilient gasket 12 therebetween. The base plate 10 is preferably made of wood so that the same may be used as a cutting board when the device is removed therefrom. The housing member 11 conforms generally to the outline of the base plate or cutting board 12 and is raised at its rear end 13 to accommodate certain elements of the operating mechanism as will be described more particularly hereinafter. The raised rear portion 13 of the housing member 11 has a recess 9 adapted to accommodate a tumbler or other receptacle (not shown) for receiving the juice extracted by the device.

The frame of the device comprises an inverted U-shaped member 14 secured to the housing member by suitable bolts 15, and supported thereon is a bowl-shaped member 16 partially cut away at the front to form an opening 17. The upper edge of the member 16 is generally circular except for the shoulders 18 and 19 extending along either side thereof. The bowl-shaped member 16 is secured to the frame 14 by suitable bolts 6.

Disposed between the shoulders 18 and 19 and the housing member 11 is a casing 20 which is generally rounded and inset at the front of the device to form an arcuate pocket to permit the positioning of a tumbler or the like in the recess 9 beneath the opening 17.

Resting on the bowl-shaped frame 16 is a removable dish-shaped member 21 having a lip or spout 22 extending through the opening 17 for permitting extracted juices to flow therethrough into the tumbler or other receptacle set therebeneath.

Supported on the dish-shaped member 21 and secured thereto, such as by soldering or a press fit, is a circular-shaped cup 23 having a central opening 24 to permit extracted juices to flow into the spout 22 and having an upwardly turned flange 25 extending upwardly and outwardly closely adjacent the upper edge of the bowl-shaped member 16.

Removably fastened to the cup 23 is a stationary lower squeezing member 26 which has a convex profile or surface arranged in a series of concentric steps 27 over which the half of a fruit, such as a half orange, is adapted to be placed. The squeezing member 26 is provided with a plurality of small openings 28 through which the extracted juice may flow to the cup member 23. The squeezing member 26 is held on the cup 23 by projections 29 on the cup 23, and the member 26 is adapted to be engaged and disengaged therefrom by turning the member to align the notches 30 therein with the projections 29.

The squeezing of the fruit against the lower squeezing member 26 is accomplished by means of an upper squeezing member 31 which has a concave profile or surface 32 adapted to fit over the convex surface of the squeezing member 26. The squeezing member 31 is provided with an annular shoulder 34 adapted to abut against the upper edge of the member 16 and a flange 35 adapted to be received between the flange 25 and the lower squeezing member 26 when the squeezing members 26 and 31 are brought together, as shown in the drawing. The upper squeezing member 31 is given additional rigidity by a plurality of reinforcing ribs or flanges 36. Disposed over the upper squeezing member 31 is a rounded housing or cover plate 37 which is affixed to the member 31 by means of a set screw 38.

The upper squeezing member 31 is pivotally supported at each side on connecting arms 39 forming with crank arms 40 a toggle connection between the upper squeezing member 31 and a shaft 41 rotatably supported on the frame member 14. The ends of the connecting arms 39 are received in slots 42 in the shoulder 34 and pivotally connected therein by pins 43. However, as will be apparent, the arms are free to pivot on the pins 43 only to the extent permitted by the width of the slots 42.

The shaft 41 is adapted to be rotated by manually pivoting an actuating lever arm 44 which is fixed to the shaft 41 and retained thereon by means of the set screw 45. Spring washers 46 are inserted between the crank arms 40 which are keyed to the shaft 41 and the frame 14.

Each of the connecting arms 39 extends through slots 47 in the shoulders 18 and 19 and is provided with an elongated generally arcuate guideway 49 adapted to receive a guide pin 50 extending inwardly through the slots 47. It will be observed that the guideway 49 is slanted upwardly and forwardly of the device at the top thereof and forwardly and downwardly of the device at the lower portion thereof. The curvature of the guideway 49 is such that the connecting pins 43 (the point at which the upper squeezing member 31 is pivotally connected to the arms 39) remains in substantially the same vertical plane during operation thereof by the actuating arm 44 through the toggle connection consisting of the arms 39 and 40. Accordingly, the squeezing member 31 is brought toward the lower squeezing member 26 in substantially a straight line vertical manner which greatly facilitates the squeezing of fruit placed therebetween.

The toggle arrangement, consisting of connecting arms 39 and crank lever arms 40, is so fixed to the shaft 41 that the crank lever arms 40 are substantially vertical and extending downwardly from the shaft 41 when the upper and lower squeezing members are brought together, at which time the actuating lever arm 44 is substantially horizontal. It will be apparent that, in view of this relationship of the various lever arms, the maximum speed and the least leverage is obtained when the upper and lower squeezing members are separated to the greatest extent, while the slowest speed and the strongest leverage is obtained when the squeezing members are brought closely together. In this way, the necessary extra mechanical advantage is obtained at the last stage of squeezing the fruit which normally is the most difficult step of the operation and requires the greatest manual pressure by the operator.

Disposed across the lower squeezing member 26, in accordance with the invention, is a removable flexible strip 51 which is received in slots 52 in the squeezing member and positioned therein by the flanges 53 which abut against the interior of the squeezing member adjacent the slots 52. Supported at the center of the flexible strip 51 is a stopper 54 which, in the normal position of the strip 51, is adapted to close the opening 24 in the cup 23 thereby preventing the flow of extracted juice therethrough. However, when the upper squeezing member 31 is brought downwardly on the lower squeezing member 26, the annular flange 35 on the upper squeezing member 31 exerts a downward pressure on the ends of the flexible strip 51 causing the center of the strip to flex upwardly thereby withdrawing the stopper 54 from the opening 24, thereby permitting juice to drain downwardly through the opening 24. As a result of this construction, there can be no flow of extracted juice from the device except when downward pressure is exerted on the upper squeezing member 31 and when this member is brought closely adjacent the lower squeezing member 26. If at any time it is desired to stop the flow of extracted juice from the device, as, for example, when it is desired to change receptacles or tumblers, it is necessary only to release the pressure on the actuating lever arm 44, whereupon the ends of the flexible strip 51 are released to permit the strip to move the stopper 54 into engagement with the opening 24.

In view of the above description, it will be apparent that there has been provided by the present invention a fruit juicer which functions in an improved manner and which has many novel features, including those specifically mentioned in the objects above. The squeezing members are brought together in a substantially straight line manner to afford an improved squeezing action while, at the same time, optimum leverage action is provided. Also, the flow of extracted juice from the device is automatically controlled during the operation of the device to further improve the usefulness of the device. At the same time, the device is of simple construction and attractive in appearance with a minimum of movable parts, and may be readily and easily assembled.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A fruit juicer comprising a frame, a stationary squeezing member mounted on the frame, a second squeezing member, and means for mounting said second squeezing member in cooperating relationship with the stationary squeezing member and for bringing said members together in a substantially straight line manner comprising a manually operable actuating arm pivotally mounted on the frame, a toggle connection between said actuating arm and the second squeezing member comprising a pair of pivotally connected arms on each side of the member, one of said arms being adapted to be pivoted by the actuating arm and the second of said arms being pivotally connected to the second squeezing member, and guide means for said second arm comprising an arcuate guideway and a cooperating guide member on the arm and frame.

2. A fruit juicer comprising a frame, a stationary lower squeezing member mounted on the frame, an upper squeezing member, and means for mounting the upper squeezing member above the lower squeezing member and for moving it to and from the lower member in a substantially straight line manner comprising a manually operable actuating arm pivotally mounted on the frame, a toggle connection between said arm and the upper squeezing member comprising a pair of pivotally connected arms on each side of the member, the first of said arms being adapted to be pivoted by said actuating arm and the second of said arms being pivotally connected at one end to the first of said arms and at the upper end to the upper squeezing member, and a guide pin mounted on the frame, said second arm of the toggle having an arcuate guideway for slidably receiving said pin whereby the upper end of the arm is guided for movement in a substantially straight line manner.

3. A fruit juicer device comprising a frame, a stationary lower squeezing member mounted on the frame and having a convex surface, an upper squeezing member having a complementary-shaped concave surface, and means for mounting said upper squeezing member above the lower member and for bringing said complementary surfaces together in a substantially straight line manner, comprising a rotatable shaft mounted on the frame, a manually operable actuating arm for rotating said shaft, a toggle connection between said shaft and the upper squeezing member comprising a crank arm fixed at one end to the shaft and a connecting arm pivotally secured at its lower end to the crank arm and at its upper end pivotally secured to the upper squeezing member, said crank arm extending substantially vertically downwardly when the members are brought together, and a guide pin on the frame, said connecting arm having a curved slot therein for receiving the guide pin, the upper portion of said slot being curved upwardly and inwardly of the device and the lower portion being curved downwardly and inwardly of the device whereby the upper end of the connected arm is caused to move in a substantially vertical straight line direction when the actuating arm is operated.

4. In a fruit juicer of the type having a lower perforate stationary squeezing member and a movable upper squeezing member cooperating therewith, a juice collecting member positioned beneath said perforate squeezing member having a drain opening therein, a stopper adapted to close said drain opening, a resilient flexible member normally positioning the stopper to close said drain opening and adapted to be flexed to remove the stopper from the opening, and means for flexing the flexible member when the squeezing members are brought together.

5. In a fruit juicer of the type having a lower perforate stationary squeezing member and an upper squeezing member adapted to be moved toward and away from said lower squeezing member, a juice collecting member positioned beneath the lower squeezing member having a drain opening therein, a stopper adapted to close said drain opening, a member pivotally extending through at least one side of the lower squeezing member for positioning the stopper over the drain opening, and means on the upper squeezing member for engaging the outer end of the positioning member when the squeezing members are brought together to cause said positioning member to remove the stopper from the opening.

6. In a fruit juicer of the type having a lower perforate stationary squeezing member and an upper squeezing member adapted to be moved toward and away from said lower squeezing member, a juice collecting member positioned beneath the lower squeezing member having a centrally disposed drain opening therein, a flexible strip extending through said lower squeezing member with its ends extending outwardly therefrom, a stopper for closing said drain opening mounted on the flexible strip, and means on the upper squeezing member for engaging the ends of the flexible strip to flex the strip upwardly at the center to remove the stopper from the opening when the squeezing members are brought together.

7. A fruit juicer comprising a frame, a lower stationary squeezing member mounted on the frame, an upper movable squeezing member adapted to cooperate with the lower squeezing member, means forming the sole support for said upper squeezing member comprising a pair of connecting arms and means for attaching the connecting arms to the upper squeezing member for limited pivotal movement with the connecting arms extending downwardly therefrom on opposite sides of the lower squeezing member, manually operable means on the frame below said upper squeezing member for longitudinally moving said connecting arms to raise and lower the upper squeezing member, and means for maintaining the upper squeezing member substantially coaxial with the lower squeezing member while it is raised and lowered by the connecting arms comprising bearing surfaces on each of the connecting arms intermediate the ends thereof and stationary guide means on the frame below said upper squeezing member engaging said bearing surfaces.

8. A fruit juicer comprising a frame, a lower stationary squeezing member mounted on the frame, an upper movable squeezing member adapted to cooperate with the lower squeezing member, actuating and supporting means for the upper movable squeezing member comprising a pair of connecting arms pivotally connected at their upper ends to the upper squeezing member and with their lower ends extending downwardly along opposite sides of the lower squeezing member, a manually operable lever mounted on the frame below the upper squeezing member, means pivotally connecting the lever to the lower ends of the connecting arms to move the lower ends of the connecting arms arcuately upwardly and downwardly when the lever is reciprocated, and means for maintaining the upper squeezing member substantially coaxial with the lower squeezing member while it is raised and lowered comprising an arcuate bearing surface on each of the connecting arms intermediate the ends thereof and stationary guides engaging said bearing surfaces.

9. In a fruit juicer of the type having a stationary squeezing member and a movable squeezing member cooperating therewith, a juice collecting member positioned beneath said stationary squeezing member having a drain opening therein, movable means for closing and unclosing the drain opening, and motion transmitting means driven by the movable squeezing member and connected to the movable means for moving the movable means to closed position when the squeezing members are separated and to unclosed position when the squeezing members are brought together.

10. In a fruit juicer of the type having a lower perforate stationary squeezing member and a movable upper squeezing member cooperating therewith, a juice collecting member positioned beneath said perforate squeezing member having a drain opening therein, a plug adapted to close said drain opening, means for positioning said plug in closed or unclosed position relative to the opening, said plug being biased into closed position by said positioning means, and means responsive to the relative position of the squeezing members for moving the positioning means to position the plug in unclosed position when the squeezing members are brought together.

PAUL J. KIRCHER.

REFERENCES CITED

The following references are of record in the file of this patent:

UNITED STATES PATENTS

| Number | Name | Date |
| --- | --- | --- |
| D. 130,573 | Pleiss | Dec. 2, 1941 |
| 599,856 | Middlekauff | Mar. 1, 1898 |
| 625,838 | Devore | May 30, 1899 |
| 665,988 | Baumgarten | Jan. 15, 1901 |
| 968,344 | Hackney | Aug. 23, 1910 |
| 1,152,933 | Cooper | Sept. 7, 1915 |
| 1,849,112 | Poplawski | Mar. 15, 1932 |
| 1,902,678 | Theodoropulos | Mar. 21, 1933 |
| 1,955,975 | Puterbaugh | Apr. 24, 1934 |